US010843331B2

(12) United States Patent
Mozeika et al.

(10) Patent No.: US 10,843,331 B2
(45) Date of Patent: Nov. 24, 2020

(54) MOUNTING A SENSOR MODULE TO AN UNMANNED GROUND VEHICLE

(71) Applicant: FLIR DETECTION, INC., Stillwater, OK (US)

(72) Inventors: Annan Michael Mozeika, Groton, MA (US); Mark Robert Claffee, Chelmsford, MA (US)

(73) Assignee: FLIR DETECTION, INC., Stillwater, OK (US)

( * ) Notice: Subject to any disclaimer, the term of this patent is extended or adjusted under 35 U.S.C. 154(b) by 206 days.

(21) Appl. No.: 15/900,335

(22) Filed: Feb. 20, 2018

(65) Prior Publication Data
US 2018/0236654 A1 Aug. 23, 2018

Related U.S. Application Data

(60) Provisional application No. 62/461,118, filed on Feb. 20, 2017.

(51) Int. Cl.
*B25J 9/02* (2006.01)
*B25J 5/00* (2006.01)
(Continued)

(52) U.S. Cl.
CPC ............. *B25J 5/005* (2013.01); *B25J 9/02* (2013.01); *B25J 11/002* (2013.01); *B25J 13/006* (2013.01);
(Continued)

(58) Field of Classification Search
CPC ... B25J 5/005; B25J 9/02; B25J 11/002; B25J 13/006; B25J 19/02; B62D 55/065; B62D 55/084; G05D 1/0038; G01S 13/88; G01S 15/89; G01S 17/88; G01S 17/89; Y10S 901/01; Y10S 901/02; Y10S 901/23; Y10S 901/31; Y10S 901/47
See application file for complete search history.

(56) References Cited

U.S. PATENT DOCUMENTS 6,263,989 B1 7/2001 Won
7,600,593 B2 10/2009 Filippov et al.
(Continued)

FOREIGN PATENT DOCUMENTS

WO WO 2008/097376 A2 8/2008

OTHER PUBLICATIONS

Notification of Transmittal of the International Search Report and the Written Opinion of the International Searching Authority, or the Declaration for International Application No. PCT/US2018/018740 (May 30, 2018).

*Primary Examiner* — Kevin Hurley
*Assistant Examiner* — Marlon A Arce
(74) *Attorney, Agent, or Firm* — Haynes and Boone, LLP

(57) ABSTRACT

An unmanned ground vehicle includes a main body, a drive system supported by the main body, a manipulator arm pivotally coupled to the main body, and a sensor module. The drive system includes right and left driven track assemblies mounted on right and left sides of the main body. The manipulator arm includes a first link coupled to the main body, an elbow coupled to the first link, and a second link coupled to the elbow. The elbow is configured to rotate independently of the first and second links. The sensor module is mounted on the elbow.

20 Claims, 12 Drawing Sheets

(51) Int. Cl.
  *B25J 13/00* (2006.01)
  *G05D 1/00* (2006.01)
  *B62D 55/084* (2006.01)
  *B25J 11/00* (2006.01)
  *B62D 55/065* (2006.01)
  *B25J 19/02* (2006.01)
  *G01S 13/88* (2006.01)
  *G01S 17/89* (2020.01)
  *G01S 17/88* (2006.01)
  *G01S 15/89* (2006.01)

(52) U.S. Cl.
  CPC ............ *B25J 19/02* (2013.01); *B62D 55/065* (2013.01); *B62D 55/084* (2013.01); *G05D 1/0038* (2013.01); *G01S 13/88* (2013.01); *G01S 15/89* (2013.01); *G01S 17/88* (2013.01); *G01S 17/89* (2013.01); *Y10S 901/01* (2013.01); *Y10S 901/02* (2013.01); *Y10S 901/23* (2013.01); *Y10S 901/31* (2013.01); *Y10S 901/47* (2013.01)

(56) References Cited

U.S. PATENT DOCUMENTS

| | | |
|---|---|---|
| 10,471,589 B2 * | 11/2019 | Meeker .................. B25J 9/0009 |
| 2006/0059880 A1 * | 3/2006 | Angott ................. A01D 34/008 56/10.2 A |
| 2009/0180668 A1 | 7/2009 | Jones et al. |
| 2009/0314554 A1 | 12/2009 | Couture et al. |
| 2010/0158656 A1 | 6/2010 | Seavey |
| 2012/0095619 A1 | 4/2012 | Pack et al. |
| 2012/0183382 A1 | 7/2012 | Couture et al. |
| 2012/0191269 A1 | 7/2012 | Chen et al. |
| 2012/0323366 A1 | 12/2012 | Tani |
| 2013/0054029 A1 | 2/2013 | Huang et al. |
| 2013/0231779 A1 | 9/2013 | Purkayastha et al. |
| 2013/0268118 A1 | 10/2013 | Grinstead et al. |
| 2013/0270017 A1 | 10/2013 | Wolf et al. |
| 2014/0110183 A1 | 4/2014 | Rudakevych et al. |
| 2015/0190925 A1 | 7/2015 | Hoffman et al. |
| 2016/0158936 A1 * | 6/2016 | Moridaira .............. B25J 9/1666 700/255 |
| 2016/0243701 A1 * | 8/2016 | Gildert .................... G05B 19/42 |
| 2017/0305014 A1 * | 10/2017 | Gildert ..................... B25J 9/161 |
| 2018/0319022 A1 * | 11/2018 | Yoshimura .............. B25J 9/047 |

\* cited by examiner

MOUNTING A SENSOR MODULE TO AN UNMANNED GROUND VEHICLE

PRIORITY CLAIM

This application claims the benefit of U.S. Provisional Patent Application Ser. No. 62/461,118 filed Feb. 20, 2017, the disclosure of which is incorporated herein by reference in its entirety.

BACKGROUND

This specification relates generally to mobile robots and manipulator arms for mobile robots.

Modern day warfighters, law enforcement personnel, and rescue personnel have a need to employ unmanned ground robots for various missions. Missions may vary in their requirements on the unmanned ground vehicle and thus the capability for the warfighter to easily and rapidly modify the system, sometimes in the field, to achieve their mission objectives can be critical.

SUMMARY

An unmanned ground vehicle includes a main body, a drive system supported by the main body, a manipulator arm pivotally coupled to the main body, and a sensor module. The drive system includes right and left driven track assemblies mounted on right and left sides of the main body. The manipulator arm includes a first link coupled to the main body, an elbow coupled to the first link, and a second link coupled to the elbow. The elbow is configured to rotate independently of the first and second links. The sensor module is mounted on the elbow.

DETAILED DESCRIPTION

Figure 1:
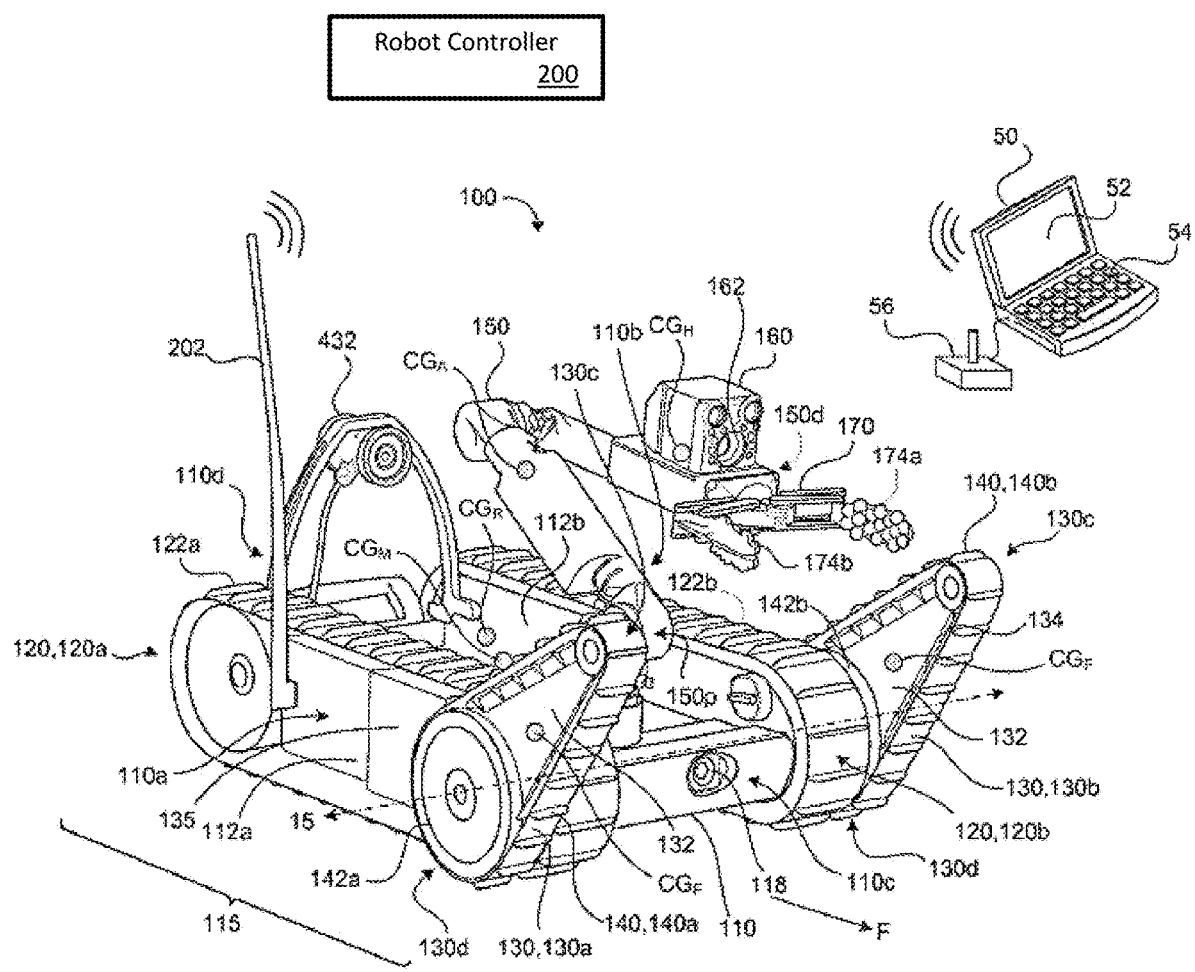
FIG. 1 illustrates an example mobile robotic vehicle.

FIG. 1 illustrates an example mobile robotic vehicle 100 that may be used as an unmanned ground vehicle capable of conducting operations in various environments such as urban terrain, tunnels, sewers, and caves. Moreover, the robot 100 may aid in the performance of urban Intelligence, Surveillance, and Reconnaissance (ISR) missions, chemical/Toxic Industrial Chemicals (TIC), Toxic Industrial Materials (TIM), and reconnaissance. Although the robot 100 shown includes a track driven drive system having flippers, other mobility platforms, configurations and morphologies are possible as well, such as wheel driven platforms, crawling or walking platforms, and so on.

The robot 100 can be designed to move about in a variety of environments, including an urban environment of buildings (including staircases), streets, underground tunnels, building ruble, and in vegetation, such as through grass and around trees. The robot 100 may have a variety of features which provide robust operation in these environments, including impact resistance, tolerance of debris entrainment, and invertible operability.

The robot 100 includes a main body 110 (or chassis) having a drive system 115 supported by the main body 110. The main body 110 has right and left sides 110a, 110b as well as a leading end 110c, a trailing end 110d and a center of gravity $CG_M$. In the example shown, the main body 110 includes right and left rigid side plates 112a, 112b disposed parallel to each other. At least one transverse support 114 rigidly couples the right side place 112a to the left side plate 112b. The rigid components are designed for strength and low weight and can be made from a material such as 7075-T6 aluminum. Alternative versions of the robot 100 can use other materials, such as other lightweight metals, polymers, or composite materials. The robot 100 may be electrically powered (e.g. by a bank of standard military BB-2590 replaceable and rechargeable lithium-ion batteries).

In some implementations, the drive system 115 includes right and left driven track assemblies 120a, 120b (also referred to as the main tracks 120) mounted on the corresponding right and left sides 110a, 110b of the main body 110 and having right and left driven tracks 122a, 122b respectively. Each driven track 122a, 122b is trained about a corresponding front wheel, which rotates about a drive axis 15. Although the robot 100 is depicted as having skid steer driven tracks, other drive systems are possible as well, such as differentially driven wheels, articulated legs, and the like.

The robot 100 includes at least one extendable flipper 130 mounted on the main body 110. In some examples, the robot 100 is configured to releasably receive one or more flippers 130 onto the main body 110 (e.g., onto and concentric with one of the front drive wheels at the leading end 110c of the main body 110). As shown in FIG. 1, the robot 100 includes right and left flippers 130a, 130b, which are shown in an extended configuration extending beyond the front or leading end 110c of the main body 110.

The flippers 130, 130a, 130b each have a distal end 130c, a pivot end 130d, and a flipper center of gravity $CG_F$ between the distal and pivot ends 130c, 130d. Each flipper 130, 130a, 130b pivots about the drive axis 15 near the leading end 110c of the main body 110. Moreover, each flipper 130, 130a, 130b may have a driven flipper track 140, 140a, 140b trained about flipper drive wheel 142a, 142b, which is driven about the drive axis 15 at the pivot end 130d of the flipper 130a, 130b.

In the example shown, flipper track supports 134 disposed on a flipper side plate 132 of the flipper 130 support the corresponding flipper track 140. In some implementations, the flippers 130, 130a, 130b can be rotated in unison in a continuous 360 degrees between a stowed position, in which the flippers 130 a, 130b are next to the right and left side plates 112a, 112b of the main body 110, and at least one deployed position, in which the flippers 130a, 130b are pivoted at an angle with respect to the main tracks 122a, 122b. The center of gravity $CG_R$ of the robot 100 can be contained within an envelope of the 360 degree rotation of the flippers 130a, 130b.

In some implementations, the flipper side plates 132 of the respective right and left flippers 130a, 130b are rigidly coupled to one another through the articulator shaft to move together in unison. In other implementations, the flippers 130a, 130b pivot independently of each other. The combination of main tracks assemblies 120a, 120b and flippers 130, 130a, 130b provide an extendable drive base length to negotiate gaps in a supporting surface. In some examples, the right main tack 122a and the right flipper track 140a are driven in unison and the left main tack 122b and the left flipper track 140b are driven in unison to provide a skid steer drive system.

The main body 110 may include one or more cameras 118 disposed near the leading end 110c of the main body 110 and may be positioned to have a field of view directed forward and/or upward. The camera(s) 118 may capture images and/or video of the robot environment for navigating the robot 100 and/or performing specialized tasks, such as maneuvering through tunnels, sewers, and caves, etc.

The robot 100 may include one or more robotic manipulator arms 150 (e.g., articulated arms) each having a pivot end 150p pivotally coupled to the main body 110 and a distal end 150d that may be configured to receive a head 160 or a gripper 170 or both. The arm 150 may be coupled to the main body 110 in a manner that allows the arm 150 to be stowed along the main body 110 in a compact configuration and pivot away from main body 110 to allow a wider range of CG-shifting, for example, to negotiate obstacles.

As shown in FIG. 1, a head 160 and a gripper 170 are mounted on the distal end 150d of the arm 150. The arm 150 has an arm center of gravity $CG_A$ and the head 160 has a center of gravity $CG_H$. The head 160 may include a camera 162 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components.

To achieve reliable and robust autonomous or semi-autonomous movement, the robot 100 may include a sensor system having several different types of sensors. The sensors can be used in conjunction with one another to create a perception of the robot's environment (i.e., a local sensory perception) sufficient to allow a control system for the robot 100 to determine actions to take in that environment. The sensor system may include one or more types of sensors supported by the robot body 110, which may include obstacle detection obstacle avoidance (ODOA) sensors, communication sensors, navigation sensors, and so on.

For example, these sensors may include proximity sensors, contact sensors, cameras (e.g., volumetric point cloud imaging, three-dimensional (3D) imaging or depth map sensors, visible light camera and/or infrared camera), sonar (e.g., ranging sonar and/or imaging sonar), radar, LIDAR (Light Detection And Ranging, which can entail optical remote sensing that measures properties of scattered light to find range and/or other information of a distant target), LADAR (Laser Detection and Ranging), laser scanner, ultrasound sensor, and so on.

In some implementations, the robot 100 includes a robot controller 200 in communication with the drive system 115, the arm 150, and any head(s) 160 or gripper(s) 170 mounted on the arm 150. The robot controller 200 may issue drive commands to one or more motors driving the main tracks 120 and the flipper tracks 140. Moreover, the robot controller 200 may issue rotational commands to a flipper motor 135 to rotate the flippers 130 about the drive axis 15. The robot controller 200 may include one or more computer processors and associated memory systems.

The robot controller 200 may be implemented in hardware, software, firmware, or combinations of hardware, software and/or firmware. In some examples, the robot controller 200 may be implemented using a non-transitory computer readable medium storing computer executable instructions that when executed by one or more processors of a computer cause the computer to perform operations. Computer readable media may include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the robot controller 200 may be located on a single device or computing platform or may be distributed across multiple devices or computing platforms.

The proximity sensors may be converging infrared (IR) emitter-sensor elements, sonar sensors, ultrasonic sensors, and/or imaging sensors (e.g., 3D depth map image sensors) that provide a signal to a robot controller 200 when an object is within a given range of the robot 100. The robot controller 200 (executing a control system) may execute behaviors that cause the robot 100 to take an action, such as changing its direction of travel, when an obstacle is detected.

In some examples, the sensor system includes an inertial measurement unit (IMU) in communication with the robot controller 200 to measure and monitor a moment of inertia of the robot 100 with respect to the overall center of gravity CGR of the robot 100. The robot controller 200 may monitor any deviation in feedback from the IMU from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the robot controller 200 may take into account a moment of inertia of the robot 100 from its overall center of gravity CGR to prevent robot tipping. The robot controller 200 may use a model of its pose, including its current moment of inertia. When payloads are supported, the robot controller 200 may measure a load impact on the overall center of gravity CGR and monitor movement of the robot moment of inertia. If this is not possible, the robot controller 200 may apply a test torque command to the drive system 115 and measure actual linear and angular acceleration of the robot using the IMU, in order to experimentally determine safe limits.

The robot controller 200 may include a communication system 202, which includes, for example, a radio to communicate with the remote operator control unit (OCU) 50 to receive commands and issue status and/or navigation information. The OCU 50 may include a display 52 (e.g., LCD or touch screen), a keyboard 54, and one or more auxiliary user inputs 56, such a joystick or gaming unit. The OCU 50 may also include a computing processor and memory in communication. The processor is programmed for rendering graphics on the display 52. The OCU 50 allows an operator or user to control the robot 100 from a distance.

In some examples, the user can select different levels of human control over the robot 100, ranging from a teleoperation mode, in which the user directly controls the motors and actuators on the robot 100, to autonomous operation, in which the user passes higher-level commands to the robot 100. In partially autonomous operation, the robot 100 can perform tasks such as following a perimeter or wall, recovering from getting stuck in an opening or due to high centering on an obstruction, evading a moving object, or seeking light.

The robot controller 200 can be mounted in any appropriate location on the robot 100. In some implementations, the robot controller 200 is mounted on the main body 110 in a location spanning between the drive tracks or wheels. The main body 110 may include a control electronics housing that is part of the main body 110, i.e., integrated into the shape of the main body 110. This morphology results in the arm 150 payload being positioned on top of the control electronics housing. This arrangement increases the vertical height of the robot 100 when the arm 150 is installed. Alternatively, the robot controller 200 can be located in another location to open more space for the arm 150.

Figure 2:
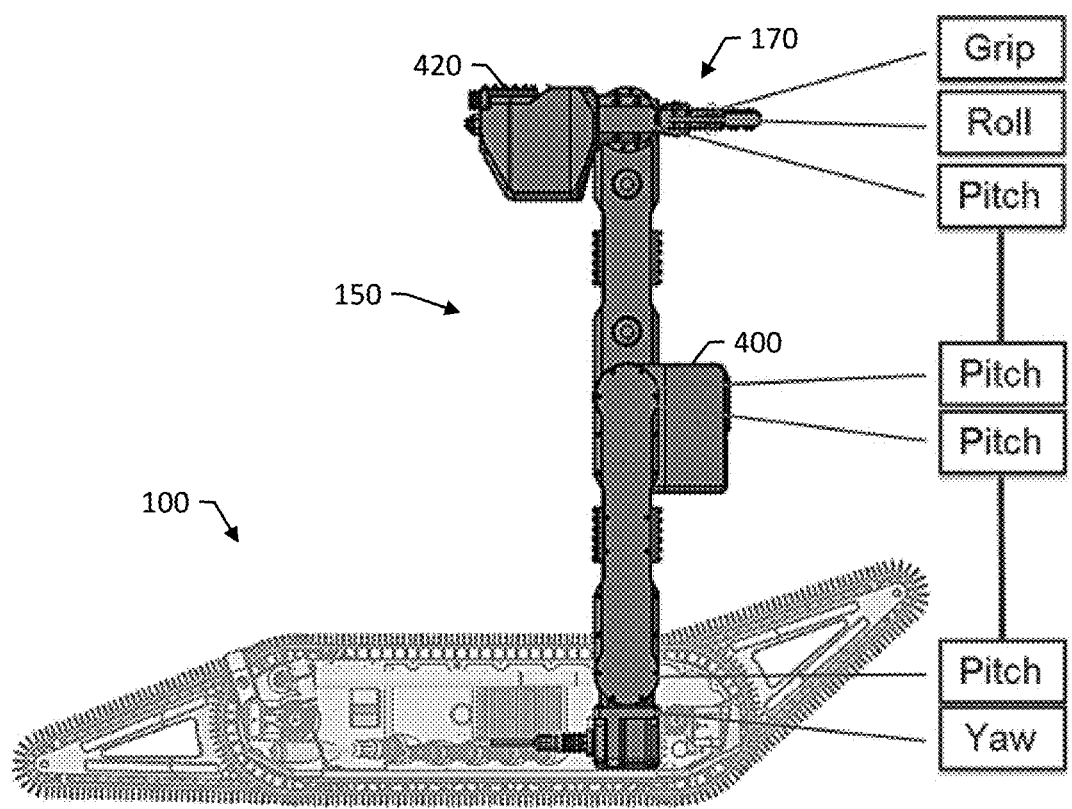
FIG. 2 is a side view the example robot in a morphology having a manipulator arm.

FIG. 2 is a side view the example robot 100 in a morphology having a manipulator arm 150. The manipulator arm 150, as illustrated in this example, has seven degrees-of-freedom (DOF). FIG. 2 shows a kinematic layout of the manipulator arm 150. The kinematic chain goes, from the main body to the end of the manipulator: yaw-pitch-pitch-pitch-pitch-roll-grip. The manipulator arm 150 is configured to move according to the kinematic chain by virtue of a plurality of electronically-controlled motors, e.g., one motor for each DOF.

The robot 100 includes a sensor module 400, e.g., an Intelligence, Surveillance, and Reconnaissance (ISR) sensor module. The sensor module 400 can include a number of sensors and appropriate processing circuitry for operating the sensors. For example, the sensor module 400 can include one or more cameras and digital circuits for producing video feeds from the cameras suitable for digital recording and/or transmission to a remote operator control unit. The sensor module 400 can include other sensors, e.g., proximity sensors, contact sensors, and other sensors as described above with reference to FIG. 1.

The sensor module 400 can be simply and rapidly repositioned at multiple locations on the robot 100 depending on the operator requirements. The sensor module 400 can be repositioned by virtue of multiple mounts for the sensor module 400, e.g., at multiple locations on the manipulator arm 150. The robot 100 may be further modular in that the robot 100 may include optional camera mounts at the front and back of the robot and the gripper 170 may include releasable gripper fingers, e.g., gripper fingers that are sized to grip onto gripper finger mounts for tool-less removal or insertion in the field.

Figure 3:
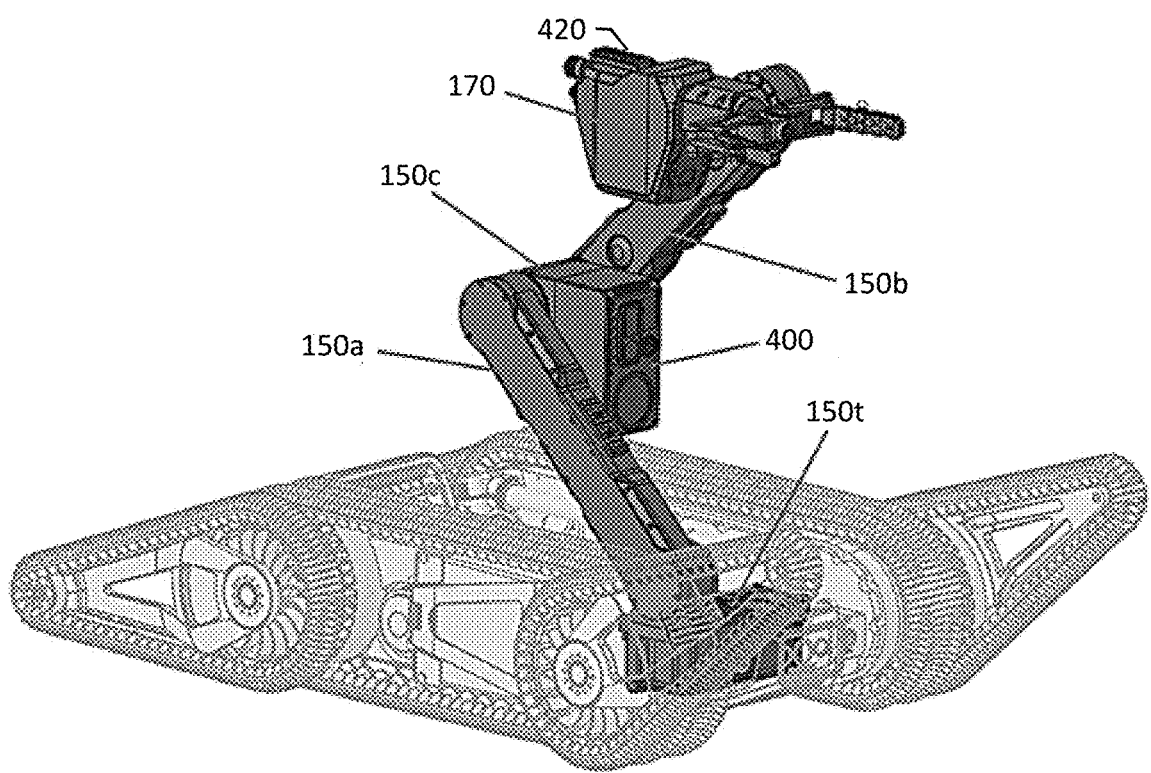
FIG. 3 is a perspective view of the robot illustrating components of the manipulator arm.

FIG. 3 is a perspective view of the robot 100 illustrating components of the manipulator arm 150. The manipulator arm 150 has a first link 150a pivotally coupled to the main body and a second link 150b that receives a gripper 170. The second link 150b is pivotally coupled to the first link 150a by way of an elbow 150c housing a motor for pivoting the second link 150b. The manipulator arm 150 also includes a turret 150t.

Although the manipulator arm 150 is illustrated in this example with two links 150a-b, in general, the manipulator arm 150 may have any appropriate number of links. A sensor module can be mounted on an elbow between any two of the links. The elbow can be controllable independently of the two links to allow for movement of the sensor module independently from the links.

In some examples, the elbow 150c includes an elbow motor for controlling a rotational orientation of the elbow 150c independently from the first and second links 150a-b. By virtue of the elbow motor, the sensor module 400 can be rotated to face further up or down or to maintain a horizontal orientation with respect to the robot 100 even as the manipulator arm 150 is extended or retracted to various positions between a fully extended position and a stowed position.

In some examples, the first link 150a includes a first motor for rotating the elbow 150c and the second link 150b includes a second motor for pivoting the second link 150b about the elbow 150c. The first and second motors work together to determine the position of the sensor module 400 and the second link 150b with respect to the first link 150a. In some other examples, the manipulator arm 150 includes a dedicated elbow motor for rotating the elbow 150c, i.e., a dedicated elbow motor separate from first and second motors for pivoting the first and second links 150a-b.

The manipulator arm 150 includes a first mount for the sensor module 400 on the elbow 150c and a second mount for the sensor module 400 on top of the gripper 170. The sensor module 400 may include multiple matching mounting features. For example, suppose that the sensor module 400 is mounted to the elbow 150c by, e.g., bolts or straps or both. The sensor module 400 may also include a picatinny mounting clamp that allows the sensor module 400 to be placed on any picatinny rail. The manipulator arm 150 may have a second mount for the sensor module 400, e.g., as a picatinny rail 420 on top of the gripper 170.

Figure 4A:
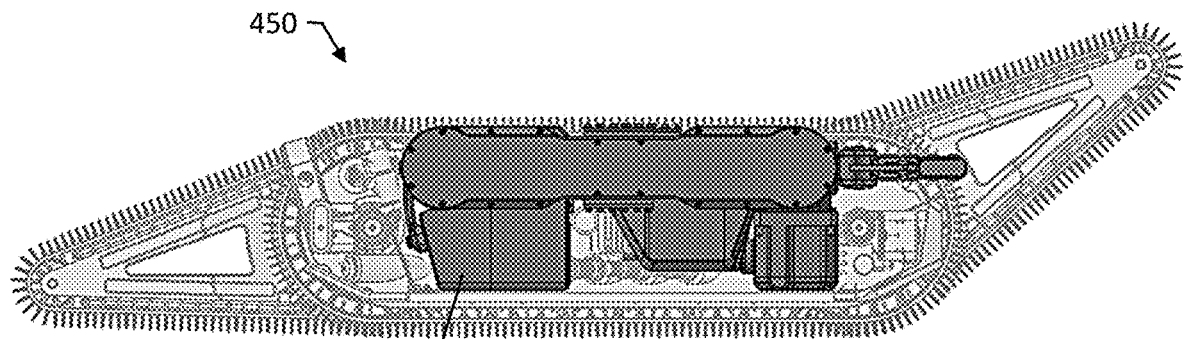
FIGS. 4A-B show examples of robots with the manipulator arm in a stowed position.
Figure 4B:
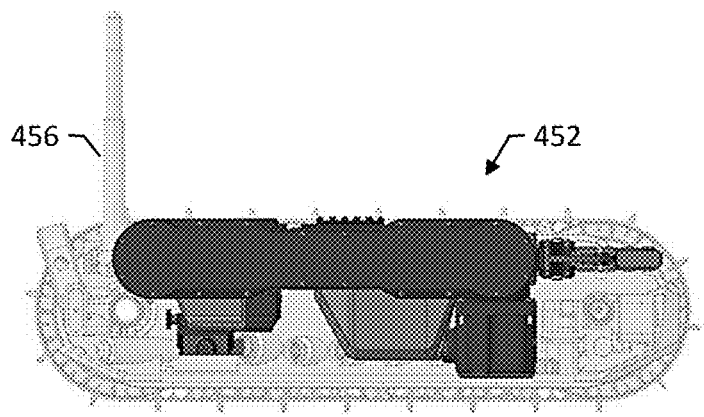
Figure 4B:
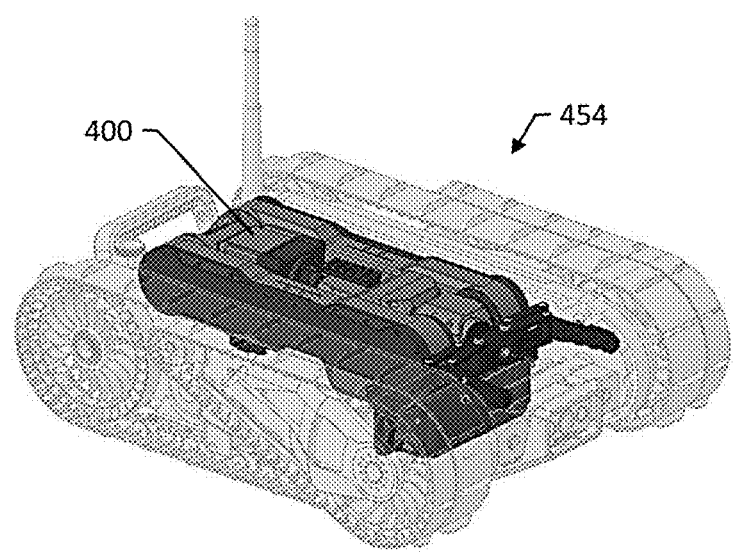

FIGS. 4A-B show examples of robots with the manipulator arm in a stowed position. FIG. 4A is a side view 450 of a robot in a morphology with both front and back flippers. The sensor module 400 is mounted to an elbow of the manipulator arm and then stowed with the manipulator arm within a volume between the tracks of the robot. In this position, both the sensor module 400 and the manipulator arm are stowed entirely within the volume between the tracks.

FIG. 4B shows a side view 452 and a perspective view 454 of a robot in a morphology with front flippers and a manipulator arm mounted forward, i.e., mounted closer to the front end of the main body and the flippers than the back end of the main body. The robot includes one or more optional telescoping antennas 456.

Figure 5A:
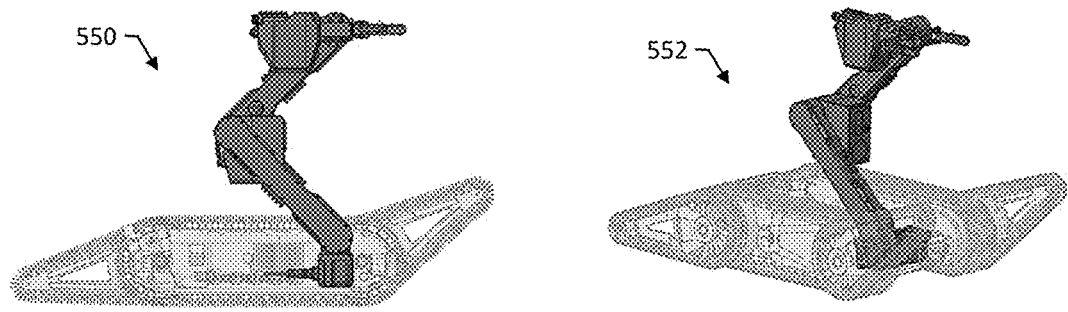
FIGS. 5A-E show examples or robots with the manipulator arm deployed and a sensor module mounted to an elbow of the manipulator arm.
Figure 5B:
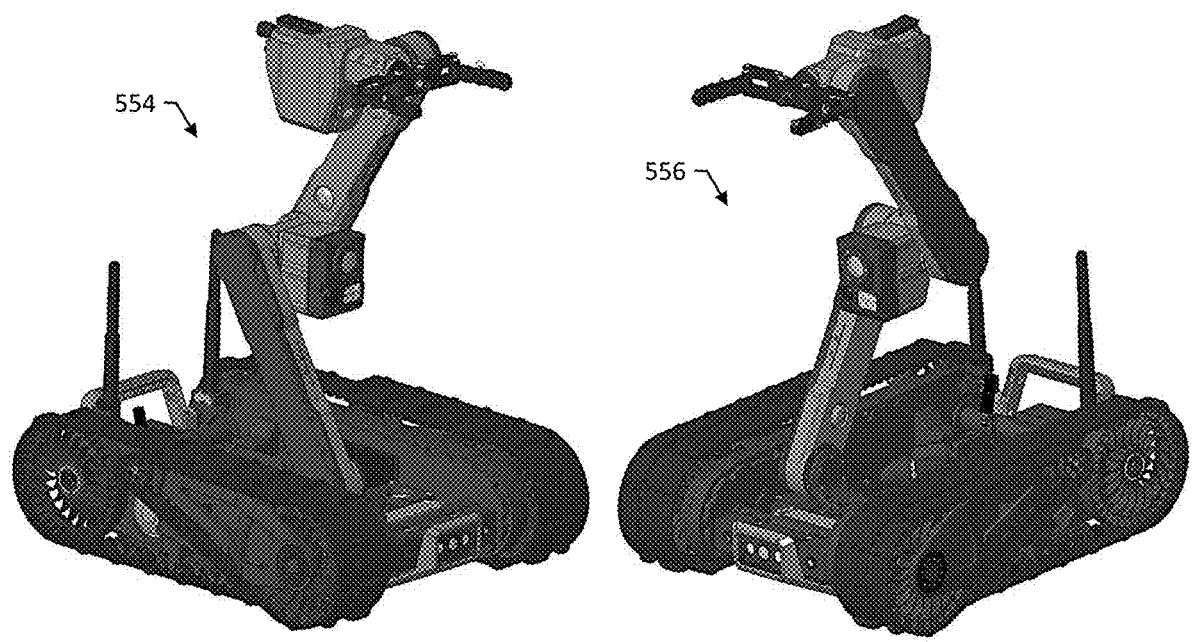
Figure 5C:
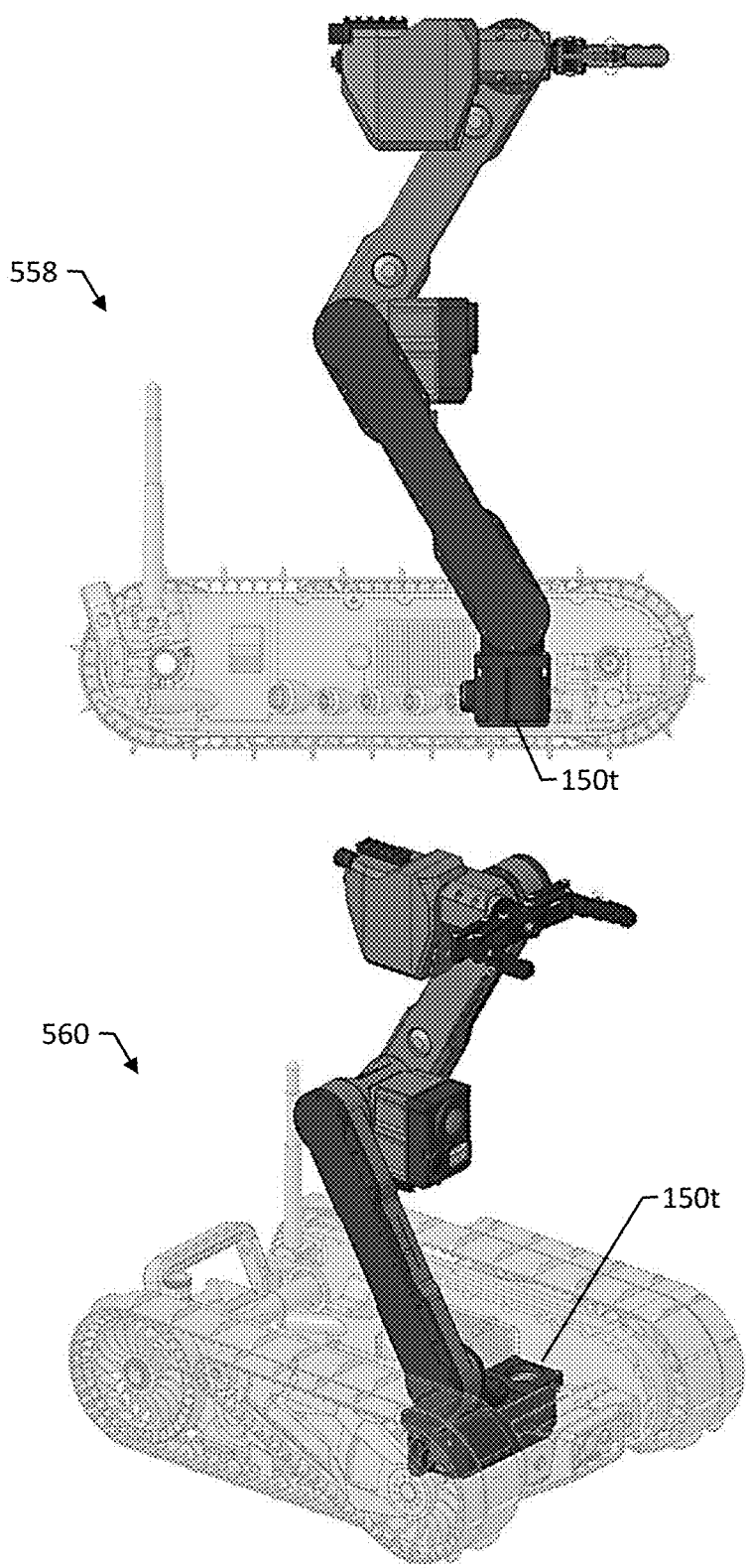

FIGS. 5A-E show examples or robots with the manipulator arm deployed and a sensor module mounted to an elbow of the manipulator arm. FIG. 5A shows a side view 550 and a perspective view 552 of the robot in a morphology with both front and back flippers. FIG. 5B shows a left side view 554 and a right side view 556 of the robot in a morphology with front flippers and a manipulator arm mounted forward. FIG. 5C shows a side view 558 and a perspective view 560 illustrating the location of the turret 150t, which is mounted low enough in the volume between the tracks so that the manipulator arm and the sensor module can fit into the volume between the tracks.

Figure 5D:
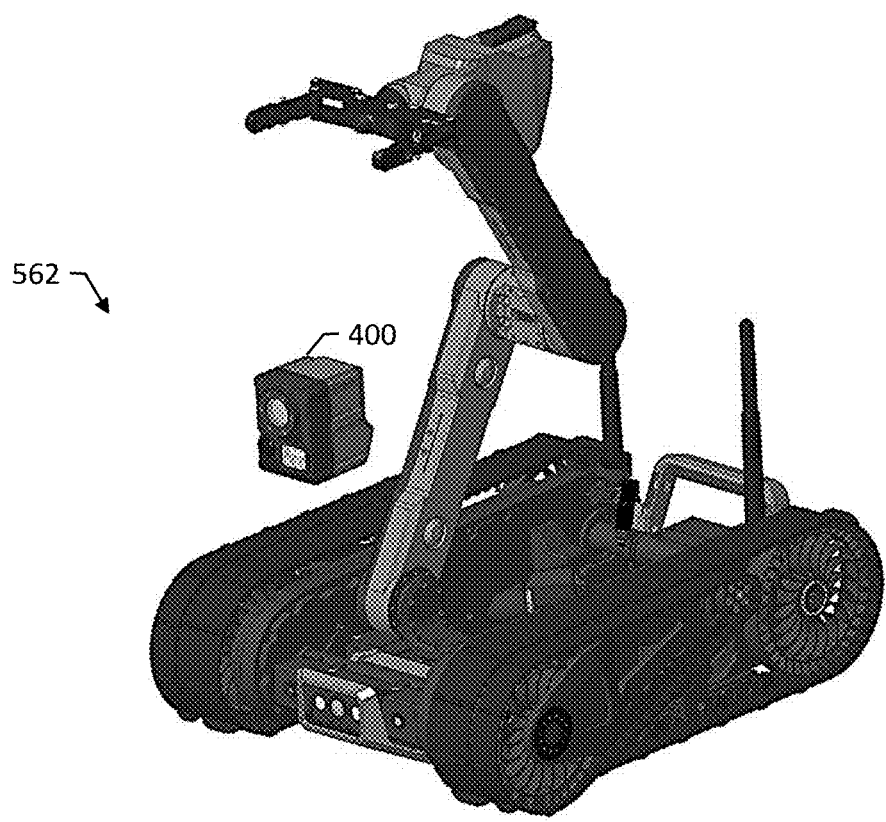
Figure 5D:
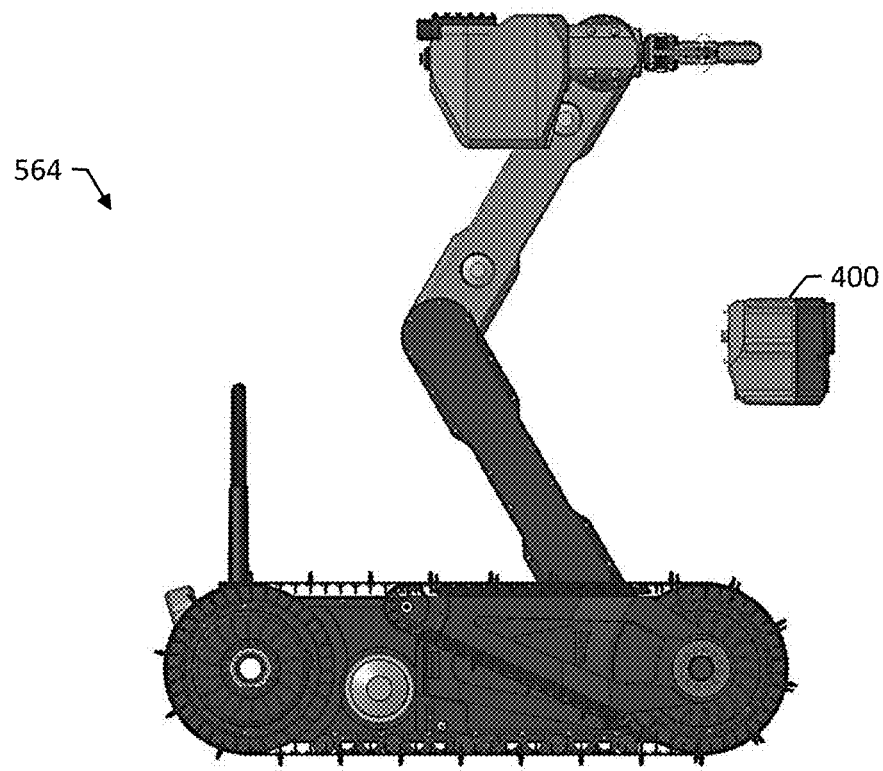
Figure 5E:
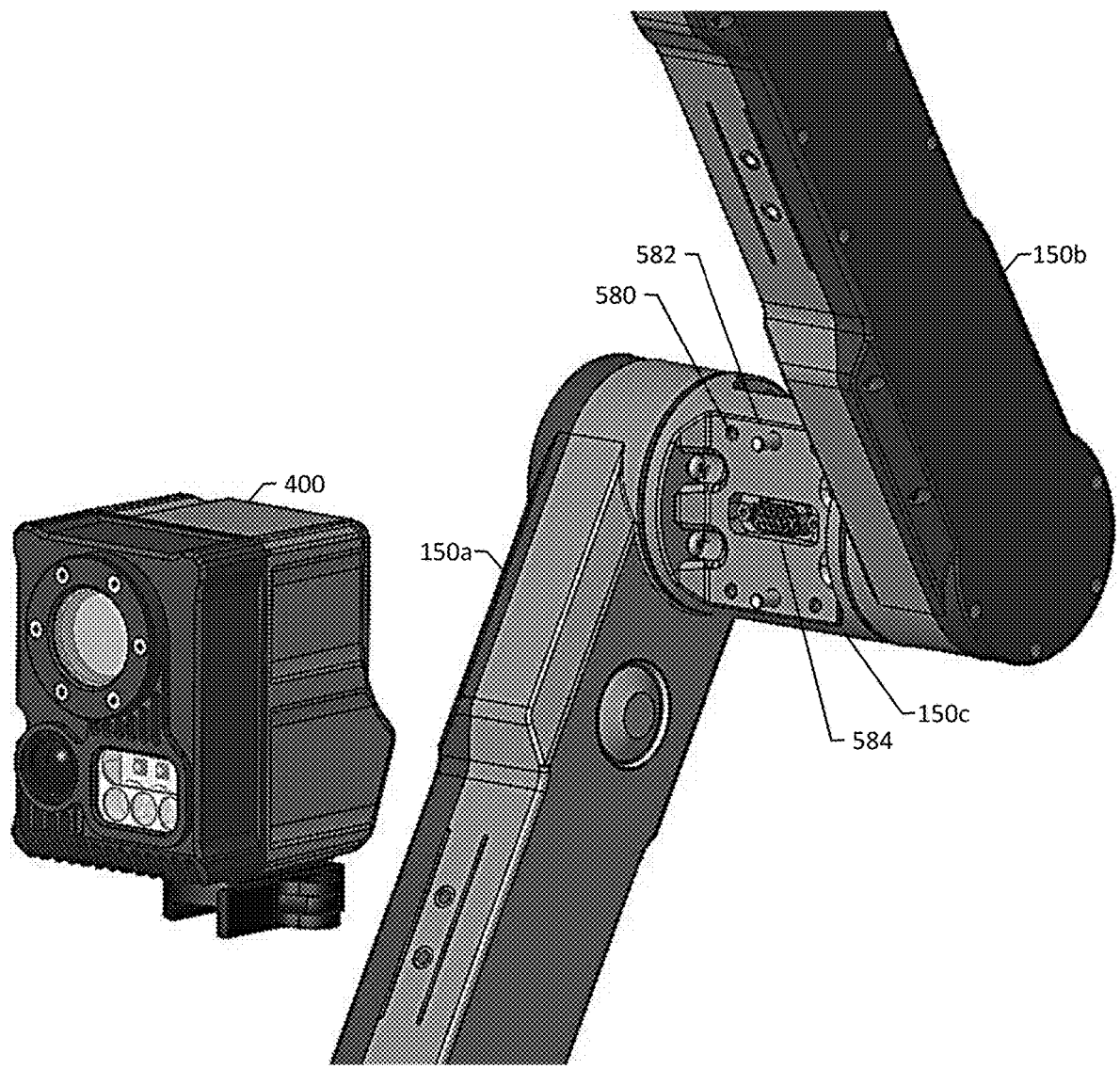

FIG. 5D shows a perspective view 562 and a side view 564 of the robot with the sensor module 400 detached from the elbow mount, illustrating the modularity of the sensor module location. FIG. 5E shows a detail view of the first and second links 150a-b and the elbow 150c. The elbow 150c includes a mounting point for the sensor module 400.

The mounting point can include posts or other mechanical structure configured for, e.g., tool-less attachment and detachment of the sensor module 400. The mounting point can include an electrical connector for providing power to the sensor module 400 and for receiving sensor data from the sensor module 400 can carrying the sensor data to, e.g., a controller on the robot.

As illustrated in FIG. 5E, the sensor module 400 is mounted to the elbow 150c by aligning pins, located on the sensor module 400, with mating holes 580 in the elbow 150c. Screws 582 are used to fasten the sensor module 400 to the elbow 150c. A blind mating connector 584 provides power and signal to the sensor module 400. The sensor module 400 can be removed by removing the screws and pulling the sensor module 400 off the elbow 150c.

Figure 6A:
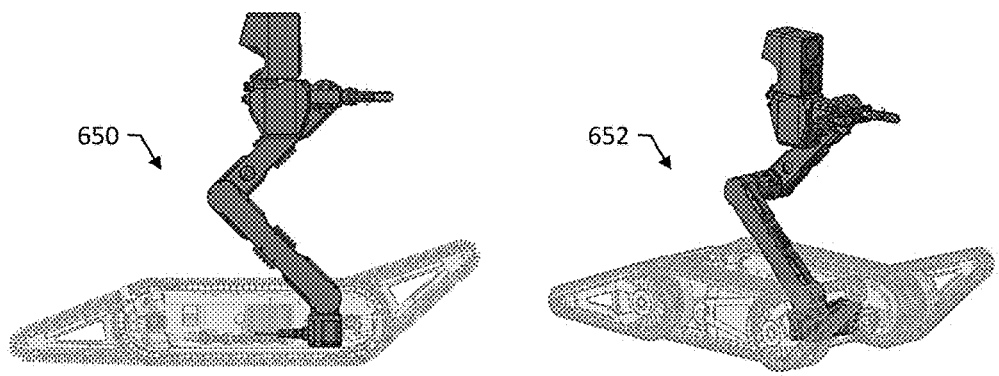
FIGS. 6A-B illustrate examples of the robot with the sensor module mounted at a distal end of a manipulator arm.
Figure 6B:
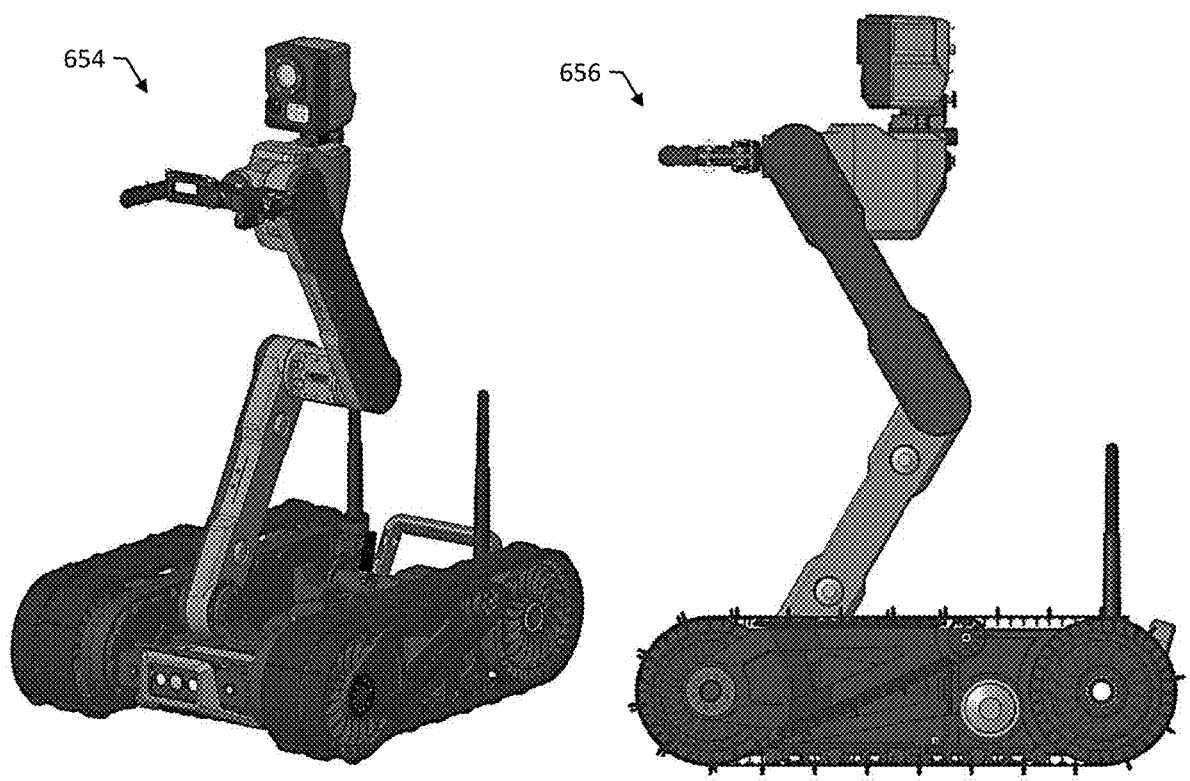

FIGS. 6A-B illustrate examples of the robot with the sensor module mounted at a distal end of a manipulator arm. FIG. 6A shows a side view 650 and a perspective view 652 of the robot in a morphology with both front and back flippers. The sensor module 400 is mounted on top of the gripper 170 using a picatinny mounting interface. The manipulator arm 150 is deployed. This allows for a higher view point for the sensor module 400 and thus a possibly improved situational awareness. FIG. 6B shows a perspective view 654 and a side view 656 of a robot in a morphology with front flippers and the manipulator arm mounted forward.

Figure 7A:
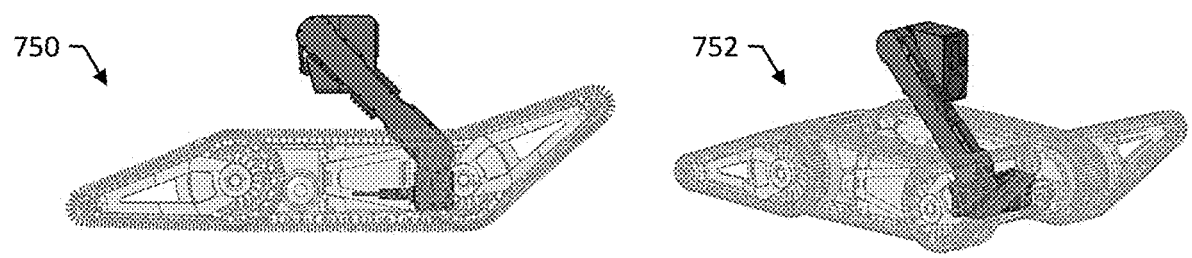
FIGS. 7A-C illustrate examples of the robot in a configuration where the manipulator arm includes a first link and an elbow and lacks a second link.
Figure 7B:
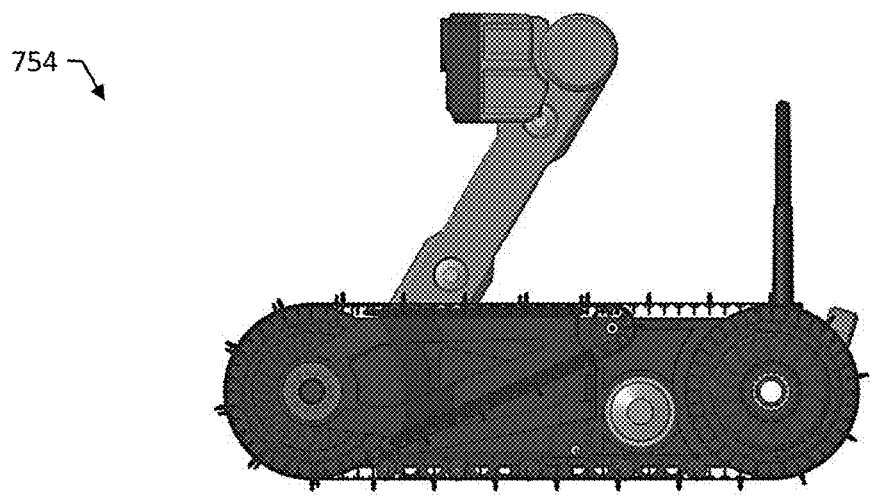
Figure 7B:
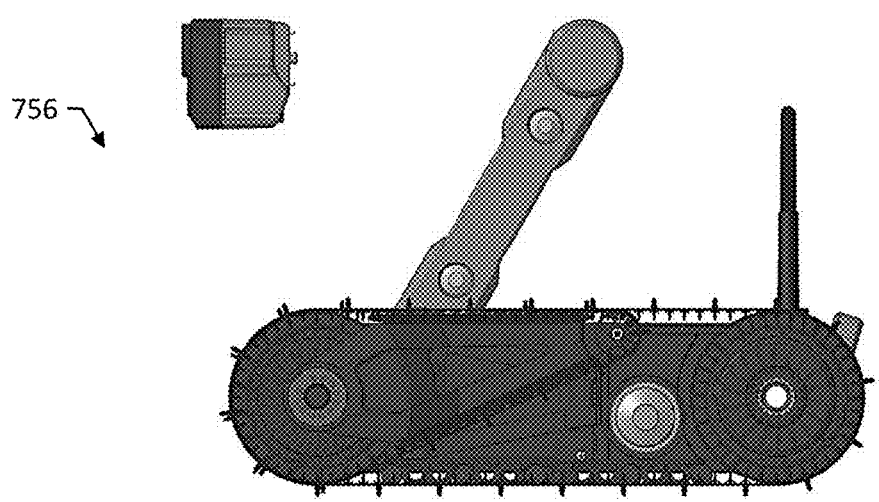
Figure 7C:
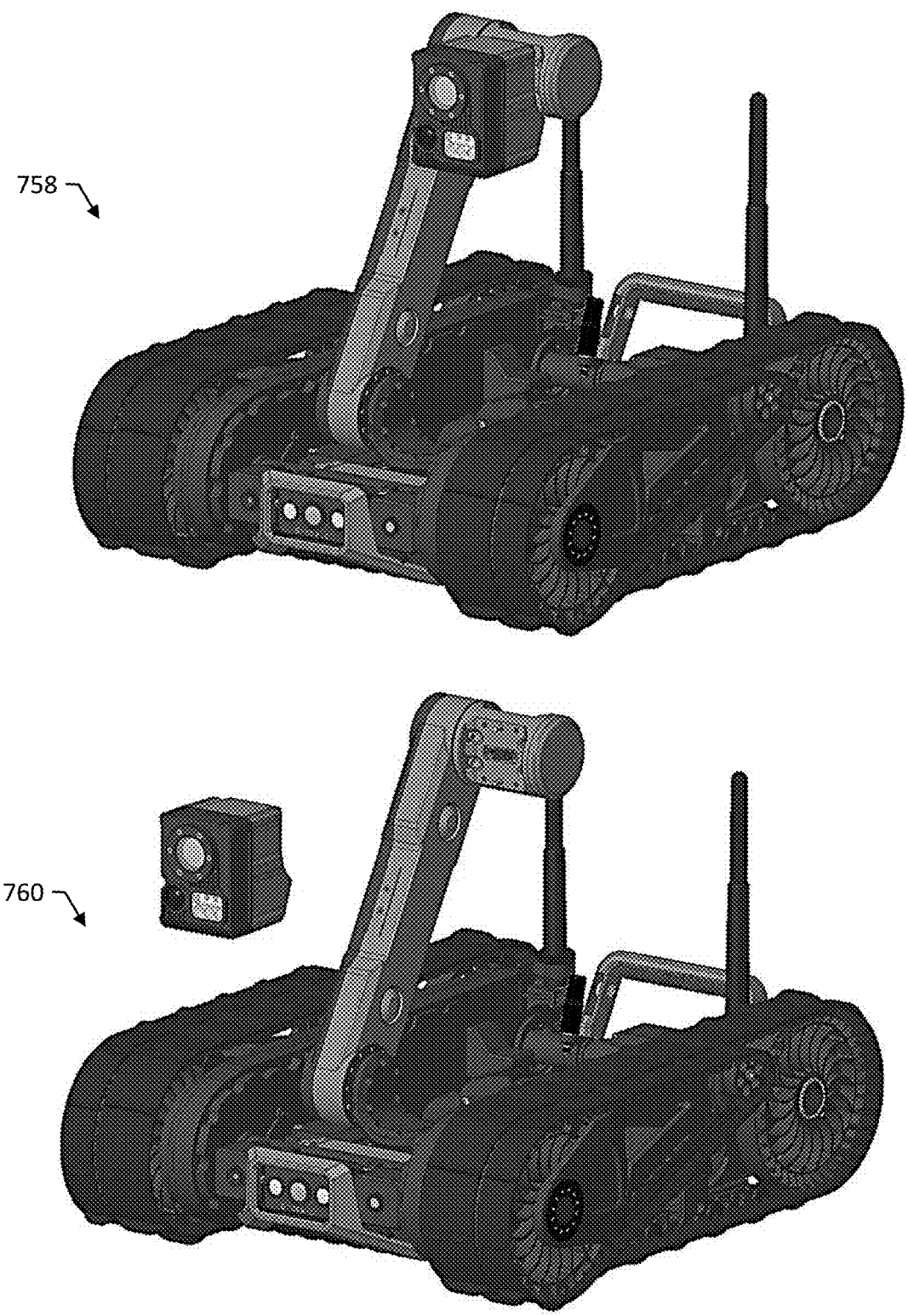

FIGS. 7A-C illustrate examples of the robot in a configuration where the manipulator arm includes a first link and an elbow and lacks a second link. FIG. 7A shows a side view 750 and a perspective view 752 of the robot in a sensor-only configuration where the second link 150b and gripper 170 are removed from the manipulator arm 150. The sensor module 400 is mounted on the elbow 150c. This allows for a lighter overall robot for situations not requiring gripper manipulation with the environment while retaining the ability to pan/tilt the sensor module 400. The elbow pitch DOF allows for the sensor module 400 to pitch up/down relative to the manipulator arm 150 while the turret yaw DOF provides pan capability.

FIG. 7B shows a side view 754 of the robot in a morphology with front flippers and a manipulator arm mounted forward and a sensor module mounted on the manipulator arm. FIG. 7B also shows a side view 756 with the sensor module detached. FIG. 7C shows a perspective view 758 of the robot in a morphology with front flippers and a manipulator arm mounted forward and a sensor module mounted on the manipulator arm.

FIG. 7C also shows a perspective view 760 with the sensor module detached.

Figure 8:
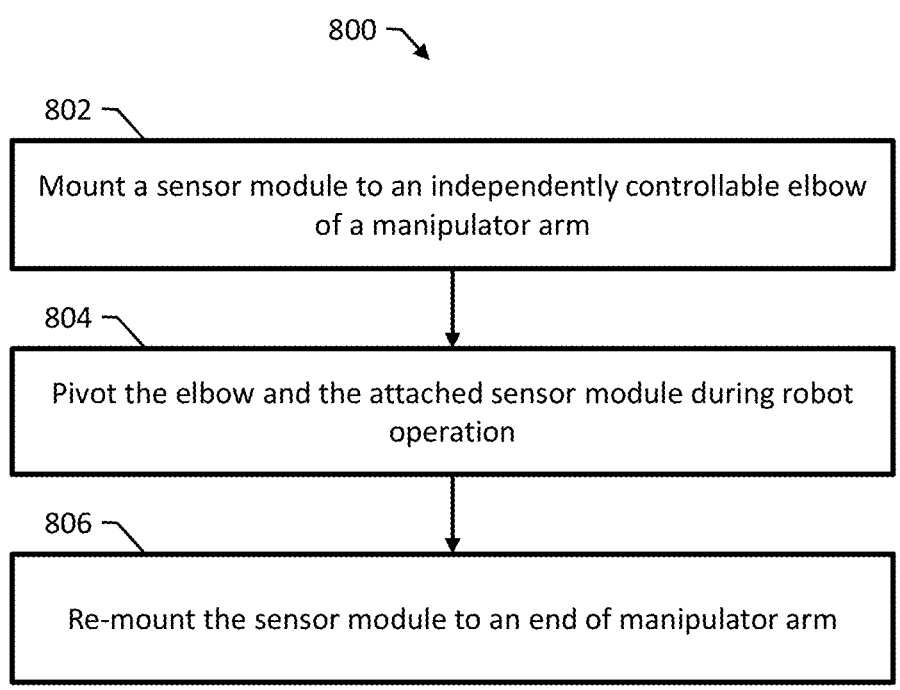
FIG. 8 is a flow chart of an example method for operating an unmanned ground vehicle.

FIG. 8 is a flow chart of an example method 800 for operating an unmanned ground vehicle. The method 800 can be performed by an operator in the field. The method 800 includes mounting a sensor module to a first location on a manipulator arm, e.g., an independently controllable elbow of the manipulator arm (802). The method 800 includes operating the robot and pivoting the elbow and the attached sensor module during robot operation (804). The method 800 includes re-mounting the sensor module a second location on the manipulator arm, e.g. to a top of a gripper on the manipulator arm using a picatinny rail, and then further operating the robot with the sensor module at the second location (806).

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An unmanned ground vehicle comprising:
   a main body;
   a drive system supported by the main body, the drive system comprising right and left driven track assemblies mounted on right and left sides of the main body;
   a manipulator arm pivotally coupled to the main body, wherein the manipulator arm comprises a first link coupled to the main body, an elbow coupled to the first link, and a second link coupled to the elbow, wherein the elbow is configured to rotate independently of the first and second links; and
   a sensor module mounted on the elbow.

2. The unmanned ground vehicle of claim 1, comprising a robot controller configured to control the drive system and the manipulator arm by supplying control signals to one or more drive system motors and one or more manipulator motors.

3. The unmanned ground vehicle of claim 1, comprising right and left flippers extending beyond a front end of the main body, wherein each of the right and left flippers pivots about a drive axis of drive system, and wherein each of the right and left flippers comprises a driven flipper track trained about a flipper drive wheel which is driven about the drive axis.

4. The unmanned ground vehicle of claim 1, comprising a communication system configured to communicate with a remote operator control unit and to transmit sensor data from the sensor module to the remote operator control unit.

5. The unmanned ground vehicle of claim 4, wherein the communication system is configured to receive commands to extend or stow the manipulator arm.

6. The unmanned ground vehicle of claim 4, wherein the communication system is configured to receive commands to pan/tilt the elbow using the elbow motor.

7. The unmanned ground vehicle of claim 4, comprising a gripper on a distal end of the second link, wherein the communication system is configured to receive commands to cause the gripper to contract to contact an object.

8. The unmanned ground vehicle of claim 1, wherein the sensor module includes a plurality of different types of sensors including at least a camera.

9. The unmanned ground vehicle of claim 1, wherein the second link is pivotally coupled to the elbow, the first link includes a first motor for rotating the elbow, and the second link comprises a second motor for pivoting the second link about the elbow, such that the first and second motors are configured to control the positions of the sensor module and the second link with respect to the first link.

10. The unmanned ground vehicle of claim 1, wherein the manipulator arm is coupled to the main body by a turret configured to provide yaw capability for the manipulator arm.

11. An unmanned ground vehicle comprising:
- a main body;
- a drive system supported by the main body, the drive system comprising right and left driven track assemblies mounted on right and left sides of the main body;
- a sensor module;
- a manipulator arm pivotally coupled to the main body, wherein the manipulator arm comprises a first link coupled to the main body, an elbow coupled to the first link, and a second link pivotally coupled to the elbow; and
- a first mount for the sensor module on the elbow and a second mount for the sensor module at a distal end of the second link.

12. The unmanned ground vehicle of claim 11, comprising an elbow motor configured to rotate the elbow independently of the first and second links.

13. The unmanned ground vehicle of claim 11, wherein the first mount for the sensor module comprises one or more bolt holes and one or more straps.

14. The unmanned ground vehicle of claim 11, wherein the second mount comprises a picatinny rail and the sensor module comprises a picatinny clamp.

15. The unmanned ground vehicle of claim 11, comprising a gripper at the distal end of the second link, wherein the second mount is located on top of the gripper.

16. A method for operating an unmanned ground vehicle, the method comprising:
- mounting a sensor module to a first location on a manipulator arm pivotally coupled to a main body of the unmanned ground vehicle, wherein the manipulator arm comprises a first link coupled to the main body, an elbow coupled to the first link, a second link coupled to the elbow, and an elbow motor configured to rotate the elbow independently of the first and second links, and wherein mounting the sensor module to the first location comprises mounting the sensor module to the elbow;
- operating the robot and causing the elbow motor to pan/tilt the elbow using the elbow motor; and
- mounting the sensor module to a second location on the manipulator arm.

17. The method of claim 16, wherein mounting the sensor module to the second location comprises mounting the sensor module to a distal end of the second link.

18. The method of claim 17, wherein mounting the sensor module to the distal end of the second link comprises mounting the sensor module to a top of a gripper on the manipulator arm.

19. The method of claim 18, wherein mounting the sensor module to the top of the gripper comprises mounting the sensor module using a picatinny clamp to a picatinny rail on the top of the gripper.

20. A method for controlling an unmanned ground vehicle, the method comprising:
- controlling, by a robot controller, a manipulator arm of the unmanned ground vehicle to extend from a stowed position to a deployed position, wherein the manipulator arm comprises a first link coupled to the main body, an elbow coupled to the first link, a second link coupled to the elbow;
- controlling, by the robot controller, the elbow to rotate and pan up and down a sensor module coupled to the elbow by controlling an elbow motor configured to rotate the elbow independently of the first and second links; and
- providing, by the robot controller, sensor data from the sensor module to a remote operator control unit.

* * * * *